United States Patent [19]

Fukushi

[11] Patent Number: 4,611,903
[45] Date of Patent: Sep. 16, 1986

[54] IMAGE FORMING APPARATUS WITH REDUCED IMAGE FORMING TIME

[75] Inventor: Yukihiro Fukushi, Yokohama, Japan

[73] Assignee: Tokyo Shibaura Denki Kabushiki Kaisha, Kawasaki, Japan

[21] Appl. No.: 551,695

[22] Filed: Nov. 14, 1983

[30] Foreign Application Priority Data

Nov. 17, 1982 [JP] Japan ................................. 57-200415

[51] Int. Cl.⁴ ........................................... G03G 15/00
[52] U.S. Cl. ..................................... 355/14 R; 355/8
[58] Field of Search .............. 355/14 R, 14 SH, 3 SH, 355/14 C, 8

[56] References Cited

U.S. PATENT DOCUMENTS

| | | | |
|---|---|---|---|
| 3,711,198 | 1/1973 | Nordine | 355/14 R X |
| 4,192,609 | 3/1980 | Tani et al. | 355/77 |
| 4,366,219 | 12/1982 | Beery | 355/14 SH X |

*Primary Examiner*—A. T. Grimley
*Assistant Examiner*—J. Pendegrass
*Attorney, Agent, or Firm*—Cushman, Darby & Cushman

[57] ABSTRACT

An image forming apparatus includes an original document transfer section for transferring a document to a predetermined position, a scanning section for scanning the document, an image forming section and a control device for controlling the functional sections. The control device energizes the exposure lamp in the scanning section at a predetermined time, before the document reaches a predetermined position, and starts the movement of the exposure lamp toward the start position of the effective scanning operation.

3 Claims, 7 Drawing Figures

F I G. 3A
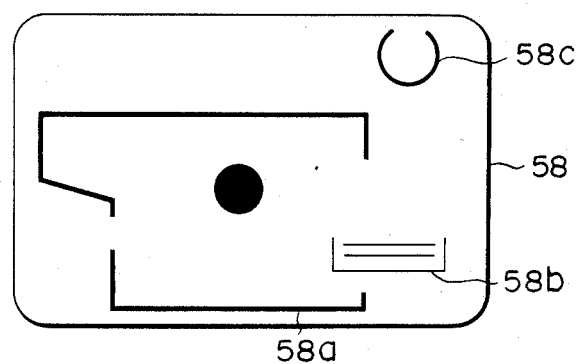
F I G. 3B
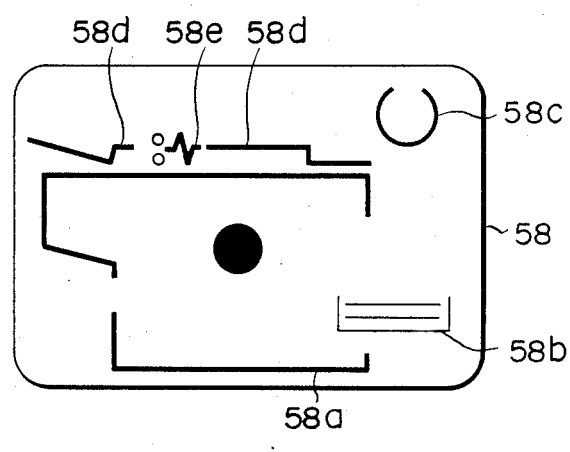

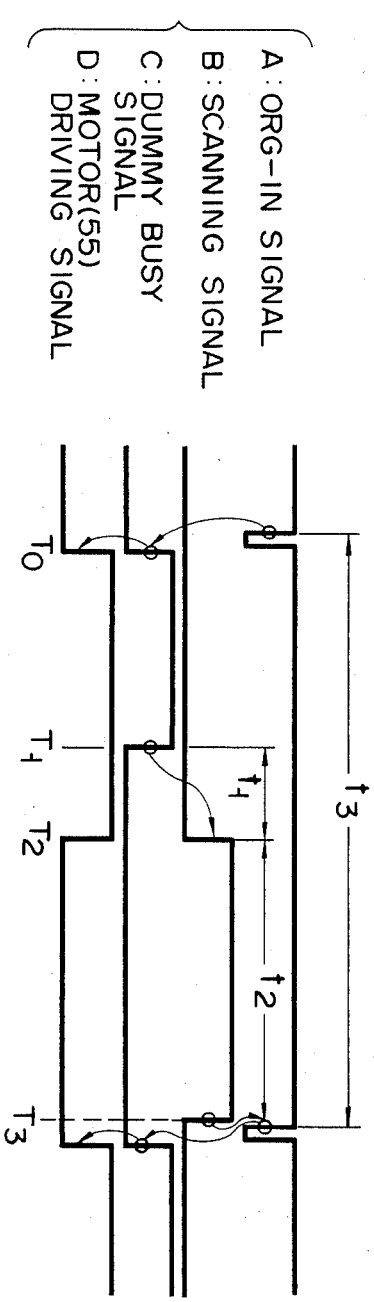
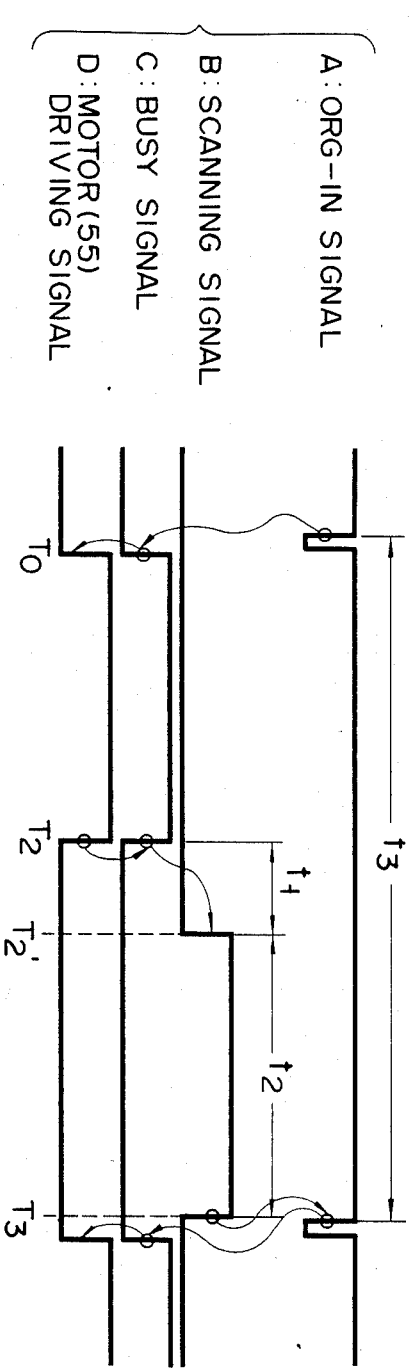

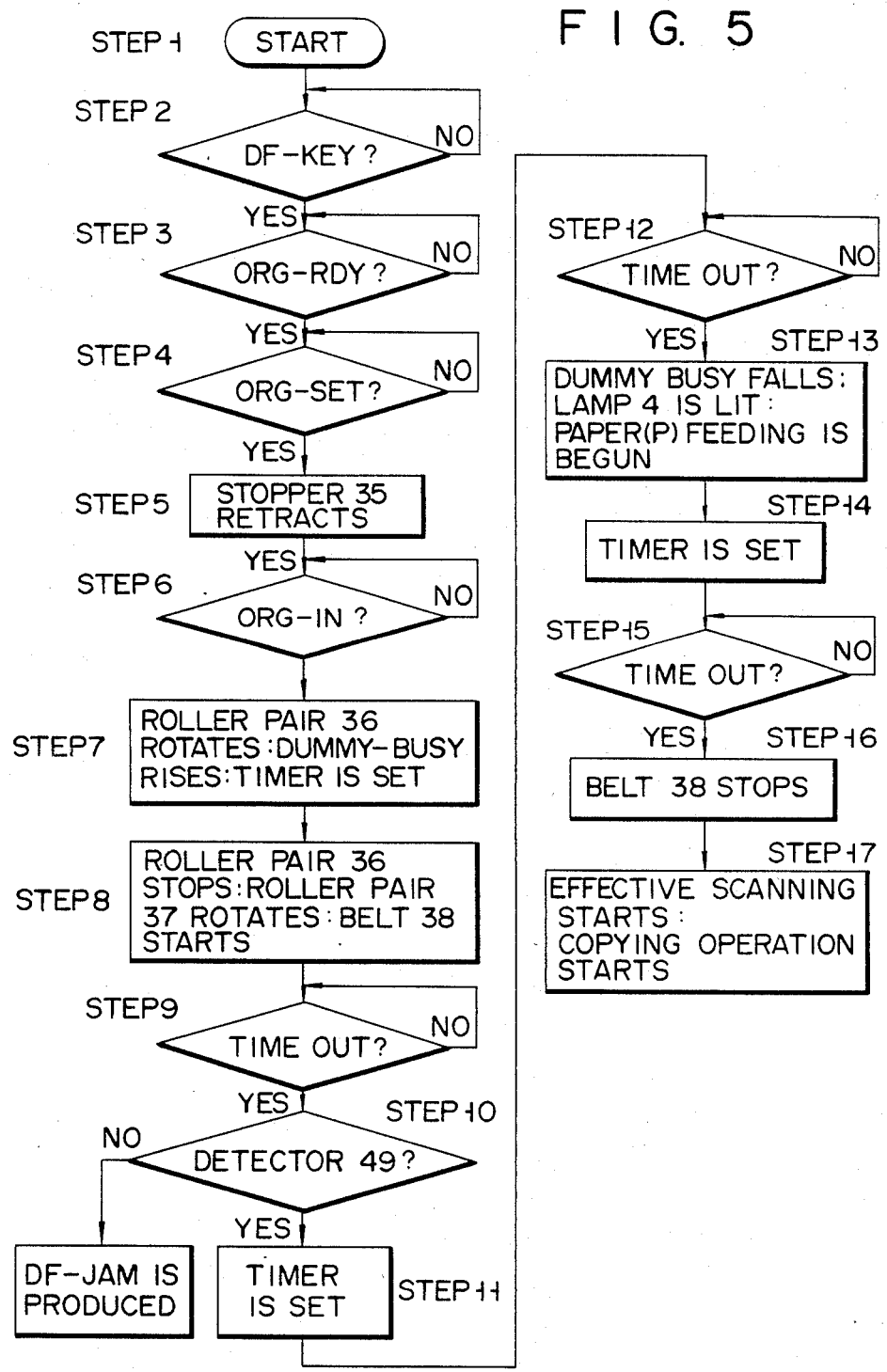
F I G. 5

IMAGE FORMING APPARATUS WITH REDUCED IMAGE FORMING TIME

BACKGROUND OF THE INVENTION

The present invention relates to an improved image forming apparatus, including copying apparatuses or facsimiles.

Among the prior art image forming apparatuses, a major drawback of a copying apparatus which is rigged with an automatic original document feeder is as follows. In response to the start-up operation for copying, an original document which has already been set is fed to a predetermined position by the automatic document feeder. A detector detects the arrival of the original document at that predetermined position. Then, a scanning section for optically scanning the original document starts a scanning-ready-operation. Upon completion of the scanning-ready-operation, the scanning section starts an effective scanning of the original document.

Effective scanning is defined as that process whereby the original document is optically scanned from one side to the other in obtaining image information contained on the original document. In the scanning-ready-operation, an exposure lamp for effective scanning is lit and the movement of the mechanical moving portion associated with the scanning section, which portion contains the exposure lamp and a mirror, is started. The copy apparatus is further provided with a photosensitive drum which directly receives the light beams from the scanning section containing the optical information on the original document, to form thereon a visible image based on the optical information. A paper feeding device is also contained in the copy apparatus for feeding a sheet of paper, onto which the visible formed image is transferred, toward the photosensitive drum. The conventional copy apparatus is so designed that paper feeding starts after the arrival of the original document at the predetermined position is detected. In the specification, the operation, whereby the paper feeding device feeds the paper to a predetermined location on the photosensitive drum, will be referred to as an image-forming-ready-operation.

A fixed time elapses from the instant the exposure lamp is energized till the intensity of light from the lamp is increased so as to be in a stationary state. Until the moving portions associated with the scanning section reach a predetermined position, the scanning section also takes a fixed period of time. Thus, the scanning-ready-operation and the image-forming ready-operation continue for their respective fixed periods.

As described above, in the prior art copying apparatus provided with an automatic original document feeder, the scanning-ready-operation and the image-forming-ready operation are started after the original document reaches a predetermined position. Thus, in the conventional copying apparatus, an actual copying operation or an effective scanning operation cannot be started, despite the fact that the document has reached the predetermined portion, i.e., despite the fact that the effective scanning preparation has been completed. This undermines the high speed copying performance of the copy apparatus, reducing the number of copies produced per given period of time.

SUMMARY OF THE INVENTION

Accordingly, a primary object of the present invention is to provide a copying apparatus with an automatic document feeder capable of reducing the time necessary for forming the image corresponding to an original document.

According to the present invention, there is provided an image forming apparatus comprising an original document transfer section for transferring an original document to a predetermined position, a scanning section for optically scanning the original document which is transferred to the predetermined position, an image forming section for forming a visible image containing optical information on the original document which is obtained by the scanning section, and control means for controlling the sections. The control means includes at least scanning-ready-operation control means for starting a scanning-ready-operation required by the scanning section at a predetermined time before the original document reaches the predetermined position.

With such an arrangement, the scanning-ready-operation is completed while the original document is being transferred toward the predetermined position. Upon arrival of the original document at the predetermined position, the effective scanning is immediately started. Therefore, the image forming time required for a single original document can be reduced.

BRIEF DESCRIPTION OF THE DRAWINGS

FIGS. 3A and 3B show the display section found in FIG. 2, illustrating some examples of displays;

FIG. 4A is a timing chart illustrating control timings of the conventional copying apparatus;

FIG. 4B is a timing chart illustrating control timings of this invention which correspond to those of FIG. 4A; and FIG. 5 is a flowchart which is useful in explaining the operation of the FIG. 1 apparatus.

DETAILED DESCRIPTION OF THE PREFERRED EMBODIMENT

Figure 1:
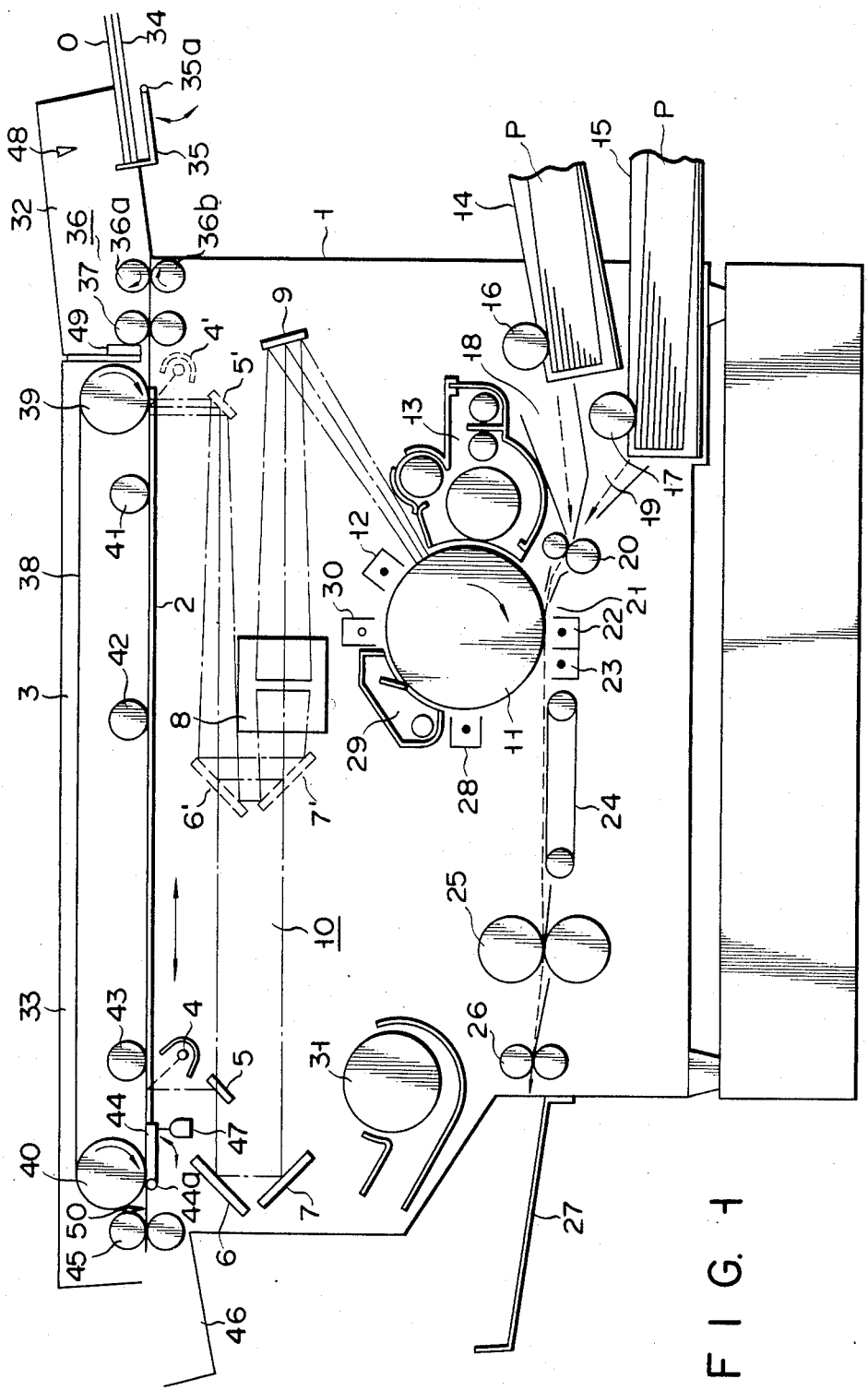
FIG. 1 is a schematic diagram of a copying apparatus which is an embodiment of the present invention.
Figure 2:
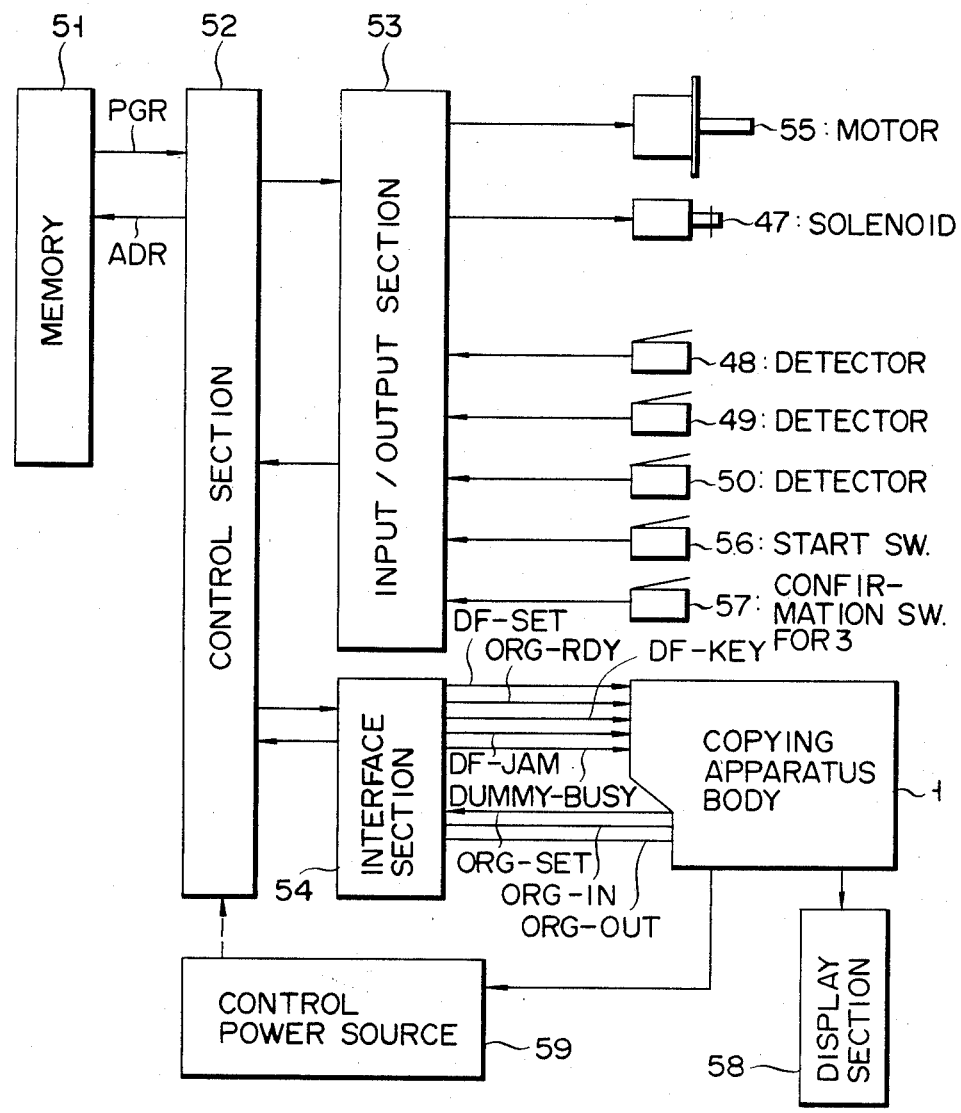
FIG. 2 is a block diagram of a control device used in the FIG. 1 apparatus.

Referring first to FIG. 1, the copying apparatus body 1 comprises an original document transfer section, a scanning section, an image forming section and the control section shown in FIG. 2. The document table (transparent glass plate) 2 of the original document transfer section is provided on the top portion of the apparatus body 1. A document transfer device 3 is openable and is provided on the document table 2. The scanning section 10 contains an exposure lamp 4 and mirrors 5, 6, 7, which components are reciprocally movable in the directions of the arrowheads and a lens block 8 and a mirror 9, which are fixed inside. The scanning section 10 optically scans an original document from one end to the other. The light beams, which are reflected from the lens 9, and contain the optical information of the document, are imaged on the surface of a photosensitive drum 11 constituting the image forming section, through a slit (not shown). The photosensitive drum 11, while rotating in the direction of an arrowhead, is deposited on the surface with charges applied from a first charger 12. A latent image configured by the image information is formed on the surface of the photosensitive drum 11. Then, a developer 13 located downstream of the first charger 12 applies a toner to the drum surface bearing the latent image, to visualize the latent image or to form a toner image.

First and second paper storing cassettes 14 and 15 store batches of copy papers P onto which the toner image is transferred. The first and second storing cassettes are selectable via a proper means, e.g., according to the desired size of the copy paper P. When the first paper storing cassette 14 is selected, the paper P is taken out sheet by sheet from the cassette by a feeding roller 16 and is fed to a roller pair 20 through a sheet guide path 18. When the second paper storing cassette 15 is selected, the paper P is taken out sheet by sheet by the feeding roller 17, and it is sent through a sheet guide path 19 to the roller pair 20. The first and second paper storing cassettes 14 and 15 are removably attached to the apparatus body 1. The roller pair 20 operates in such a way that it temporarily stops the traveling paper P and it rotates to feed it toward the photosensitive drum 11. When the paper P arrives at the toner image transfer portion 21, it is brought into intimate contact with the surface of the photosensitive drum 11 and the toner image is transferred from the drum 11 onto the sheet of paper P by the action of charges applied by a second charger 22. Then, the paper P goes under a third charger 23 for the application of charges used to separate the paper P from the photosensitive drum 11, and is separated from the drum 11 by the action of charges applied from the third charger 23. The paper P passes through a paper transfer path 24 to reach a fixing roller pair 25 used in fixing the toner image transferred onto the paper P. After the fixing step, the paper P passes through the discharge roller pair 26, to go out from the apparatus body 1, and is stored in a tray 27. The charges left on that portion of the drum 11 from which the toner image is transferred onto the paper P are removed by the aid of a fourth charger 28. The residual toner on the photosensitive drum 11 is removed by a cleaner 29. Further, the residual image is erased by a fluorescent lamp 30. Finally, the surface of the photosensitive drum 11 is returned to its initial state. An exhaust fan 31 is provided for the purpose of preventing an excessive temperature rise within the apparatus.

The document transfer device 3 contains an original document feeding portion 32 and an original document transferring portion 33. The original document feeding portion 32 further contains a tray 34 for placing thereon a set of original documents O; a stopper 35 for temporarily storing the original document O; a roller pair 36 for taking out the original document O, sheet by sheet; and another roller pair 37 for temporarily stopping the document feeding and feeding the document, when it rotates.

The tray 34 slants approximately 30° with respect to the horizontal line, as shown. With this slant, a set of documents placed on the tray 34 may slide down, by their own weight, up to the position of the roller pair 36 in the document feeding portion 32. To temporarily stop the down sliding of a document O, the stopper 35 is rotatable about a fulcrum 35a, in the direction shown. When the stopper 35 retracts to a point under the tray 34, the documents are released from the holding state. After the release of the document O set, the stopper 35 periodically repeats the rotation to vibrate the documents O from its lower side, thereby to ease the taking out of the documents. The roller pair 36 contains a pair of rollers 36a, 36b, which rotate in opposite directions, allowing the document to be fed sheet by sheet. The roller pair 37 corrects the skew of the document O and feeds the document O at a given timing, toward the original document transferring portion 33.

The original document transferring portion 33 contains a pair of rollers 39, 40 with a belt 38 mounted therearound, rollers 41 to 43 for pressing the belt 38 against the document table 2, a stopper 44, a sheet discharge roller 45 and a tray 46. The stopper 44 is rotatable about a fulcrum 44a, in the direction of the arrowhead in the drawing; and normally holds the leading end of the document O, as illustrated. When the stopper 44 is rotated clockwise, it releases the leading end of the document O.

The document transfer device 3 further contains detectors 48 to 50. Detector 48 detects the presence of the document O on the tray 34. Detector 49 detects that the document O has been fed to the original document transferring portion 33. Detector 50 detects that the document O has been discharged into the tray 46.

The operation of the document feeder 3 will now be described. A set of original documents O are set on the tray 34. Pushing a start button (not shown), the solenoid 47 is actuated to retract the stopper 44 below the document table 2; while, at the same time, the belt 38 is driven. If a document is left on the document table 2, the residual one is discharged into the tray 46. At the same time, the stopper 35 retracts under the tray 34, to feed the document O to roller pair 36. Then, roller pair 36 feeds the document O to roller pair 37. In this case, roller pair 37 rests for a fixed period of time. During this period, the skew of the leading end of the document O is corrected at roller pair 37. Then, roller pair 37 starts its rotation, and the document O is sent to the original document transferring portion 33.

At the start of rotation of roller pair 37, roller pair 36 is stopped in its rotation and the stopper 44 is returned to its stopping mode. The roller pair 36, containing the roller 36a rotating in the document feeding direction and the roller 36b rotating in the reverse direction of the former, feeds the document O sheet by sheet with the friction force thereof. The document O emanating from the roller pair 37 is transferred by the belt 38 till the leading end of the document O hits the stopper 44.

Then, the operation of the scanning section according to the present invention will be described. For scanning the document O, the scanning-ready-operation is required. In the scanning-ready-operation, the exposure lamp 4 is energized till the intensity of the light beams emitted from the exposure lamp 4 settles to a stationary state, and the exposure lamp 4 and the mirrors 5 to 7 are moved to a position which allows for effective scanning. In the present invention, the scanning-ready-operation is completed by the time the leading end of the document O hits the stopper 44. At the instant it hits the stopper 44, the effective scanning is started. As may be recalled, in the scanning section of the conventional copying apparatus, the scanning-ready-operation is started when the document O comes into contact with the stopper 44, and the effective scanning is executed at the end of the scanning-ready-operation.

Such control of the scanning section requires that the image-forming-ready operation correspond to the control of the scanning device. In the present embodiment, the paper P, e.g., in the first paper storing cassette 14, is fed to the roller pair 20 through the paper guide path 18, before the document O comes into contact with the stopper 44. The feeding of the paper P at the roller pair 20 is stopped until the copying apparatus enters the next phase of operation. At that point in time in which the document O hits the stopper 44 and the effective scanning starts, the roller pair 20 is rotated to feed the paper P to the transfer portion on the photosensitive drum 11. The roller pair 20 is so positioned that the paper P reaches the transfer portion on the photosensitive drum 11 when the latent image bearing portion on the photosensitive drum 11 reaches the transfer portion.

When effective scanning is started, the copying operation for the document O is executed as described above. In this operation, the lamp 4 and the mirrors 5 to 7 are moved to positions 4' to 7'. When the copying operation for a document is completed, the stopper 44 is energized for retract, the belt 38 is moved and the copied document O is discharged from the document table 2 into the tray 46, via the roller pair 45. When the detector 48 detects the presence of the document O in the tray 34 during this document discharge operation, the document taking out operation by the roller pair 36 is repeated. In this case, when the discharge of the document O is detected by the detector 50, the stopper 44 is returned to its stop mode, after the document discharge.

The control means for the copying apparatus body 1 may now be described with reference to the block diagram of FIG. 2. For example, a microprocessor is provided within the copying apparatus body 1, for use in controlling the functional sections of the copying apparatus. The control means of this invention has scanning-ready-operation control means and image-forming-ready-operation control means which are unlike those of the conventional apparatus, though the remaining control means are the same as those of the conventional one and will not be described here.

The document transfer device 3 includes a memory 51 (a ROM) for storing the control program used in executing the operations of the functional sections referred to above. The document transfer device 3 includes a control section 52 which sequentially reads out the program and produces control signals needed. The control section 52 produces an address signal ADR for specifying the control program in the memory 51. The memory 51 applies the data PGR from a control program corresponding to the address signal to the control section 52. The control section 52 sends the control signals corresponding to the data PGR to an input/output section 53 and an interface section 54. To the input/output section 53 are coupled the solenoid 47, the detectors 48 to 50, a motor 55, a start switch 56, and a check switch 57 for checking whether the document transfer device 3 is set. The motor 55 is a DC motor rotatable in both the forward and reverse directions. With this bidirectional rotation, the motor 55 controls the rotational movement of the stopper 35, the rotation of the roller pairs 36, 37, 45, and the travel of the belt 38. The start switch 56, mounted on the frame of the apparatus body 1, is used for causing the copying apparatus to start its copying operation. The check of confirmation switch 57 is for checking as to whether or not document transfer device 3 is closed and the belt 38 is set on the document table 2.

The control section 52 applies to the input/output section 53, signals for controlling the ON/OFF state and the rotational direction of the motor 55, as well as the ON/OFF state of the solenoid 47. Conversely, this section 52 receives the document detecting signals from the detectors 48 to 50, the start signal from the start switch 56, and the set confirmation signal from the check switch 57 which designates that the document transfer device 3 is set, through the input/output section 53.

The control section 52 sends, through an interface section 54, the set confirmation signal DF-SET, an original document set signal ORG-RDY, a start signal DF-KEY, a jam signal DF-JAM, and a dummy busy signal DUMMY-BUSY.

The signal designated DF-SET is produced as long as it is confirmed that, upon the turn on of the check switch 57, the document transfer device 3 is in a normal operable state. As long as this signal DF-SET is produced, the control sequence for the apparatus body 1 becomes the same as that including the document transfer device 3. The signal designated ORG-RDY is produced when the detector 48 detects that the document O is in the tray 34. This signal enables the apparatus body 1 to perform the copying operation of the document O in the document transfer device 3. The signal designated DF-KEY indicates that the start switch 56 is operated to instruct the start of the copying operation. The signal designated DF-JAM is produced when the detector 49 does not detect the document O within a fixed period of time, since the roller pair 36 starts to rotate. In other words, this signal indicates that a jam has occured in the document transfer device 3. For producing the jam signal DF-JAM, the control section 52 receives the detected signals from the detectors 49, 50 and checks as to whether or not they represent the occurence of a jam. The dummy busy signal DUMMY-BUSY indicates that the document O is traveling in the document transfer device 3, and is as illustrated in FIGS. 4B–C. The busy signal BUSY of FIGS. 4A–C continues from a time point $T_0$ at which the motor starts to rotate for driving the document O to a time point $T_2$ at which the document O hits the stopper 44 and the motor 55 stops. However, the DUMMY-BUSY signal of FIGS. 4B–C merely continues from time point $T_0$ to time point $T_1$, before time point $T_2$. Thus, the duration of this signal DUMMY-BUSY is set to be smaller than the period in which the document O actually moves.

The copying apparatus body 1 sends an original document ready signal ORG-SET, an original document-in signal ORG-IN, and an original document-out signal ORG-OUT to the control section 52, through the interface section 54.

The signal designated ORG-SET is for taking the document O out of the tray 34 and feeding it to the belt 38, and for discharging the document left on the document table 2 outside of the apparatus body 1. The signal designated ORG-IN operates roller pairs 36 and 37 and the belt 38 in succession, feeds the document O to the document table 2 and, when a document is left on the document table 2, discharges the remaining document outside the copying apparatus body 1. The signal designated ORG-OUT discharges the document O on the document table 2 into the tray 46.

The signals ORG-SET, ORG-IN, ORG-OUT sent forth from the apparatus body 1 may be described as follows. The ORG-SET signal is produced first, to retract the stopper 35, so that a batch of document O may be moved up to roller pair 36. Secondly, in the presence of the ORG-RDY signal, the ORG-IN signal is produced each time the document is replaced. Upon the generation of the ORG-IN signal, the document O is set on the document table 2. When the ORG-RDY signal is absent, i.e., when the detector 48 detects that a document O is not present on the tray 34, the ORG- OUT signal is produced to discharge the document O to the tray 46.

When the DF-SET signal is absent, the DF-JAM signal is produced, and since the apparatus body 1 is in a malfunction state, the copying operation stops. If the cause of the stoppage of the copying operation is removed and the required number of copies are not yet obtained, the ORG-SET signal is produced and, subsequently, the ORG-IN signal is repeatedly produced.

The display section 58 or the display device shown in FIGS. 3A or 3B both of which are liquid crystal display devices, provided on the apparatus body 1, display various operation modes of the copying apparatus. The display section 58 comprises display segments for displaying a mark 58a representing the configuration of the apparatus body 1, a mark 58b representing the configuration of both of the copying paper storing cassettes 14, 15, a mark 58c indicating that the apparatus body 1 is ready for operation, a mark 58d indicating that the document transfer device 3 is set, and a mark 58e indicating the occurence of a jam in the document transfer device 3. Mark 58d also indicates that a document is set to the document table 2. Mark 58e is displayed in response to the generation of a jam signal DF-JAM.

A control power source 59 supplies required power voltages to the memory 51, the control section 52, the input/output section 53, the interface section 54, the motor 55 and the solenoid 47. The required power is supplied from the apparatus body 1.

The ORG-IN signal, the scanning signal, the busy signal BUSY (FIGS. 4A–C), the DUMMY-BUSY signal (FIGS. 4B–C) and the motor drive signal are timed as illustrated in FIGS. 4A and 4B. FIG. 4A is a timing chart of a conventional copying apparatus. FIG. 4B is a timing chart of the copying apparatus according to the present invention. Both timing charts show that, when signal ORG-IN is produced from the apparatus body 1, control section 52 rotates the motor 55 at time $T_0$, feeds the document O from roller pair 36 to another roller pair 37, and sends the document O by the belt 38, until it comes into contact with the stopper 44. It further shows that the control section 52 further rotates the motor by a fixed amount, and then stops at time $T_2$. In FIG. 4A, the busy signal BUSY rises at time $T_0$ and falls at time $T_2$. The scanning-ready-operation is performed within the time period $t_1$ ranging from time $T_2$ to time $T_2'$. The paper P is fed from the paper storing cassette 14 or 15 to the photosensitive drum 11. The effective scanning is completed within the time period $t_2$ from time $T_2'$ to time $T_3$. In FIG. 4B, the control signal of the motor 55 rises at time $T_0$ and falls at time $T_2$, as in the case of FIGS. 4A–D. However, according to this invention, the dummy busy signal DUMMY-BUSY (FIGS. 4B–C) rises at time $T_0$ and falls at time $T_1$. The scanning-ready-operation for transferring the paper P from, for example, the first paper storing cassette 14 to the roller pair 20, is performed within the time period $t_1$ between time $T_1$ and time $T_2$. An effective scanning is performed within the time period $t_2$ between time $T_2$ and $T_3$.

When the time period from time $T_0$ to $T_2$ is 1.8 seconds, time period $t_1$ is 0.8 seconds and time period $t_2$ is 1.3 seconds, the total time period for copying a single document is 1.8+0.8+1.3, which equals 3.9 seconds (FIG. 4A), though 1.8+1.3=3.1 seconds (FIG. 4B). As may be seen from the above, the control method of FIG. 4A can allow for the copying of about 15 sheets per minute; and the control method of FIG. 4B, about 19 sheets, although the document transfer device 3 has the same document feeding speed in both methods. Thus, the method of FIG. 4B increased the number of copies approximately 20% over the method of FIG. 4A.

When roller pair 37 is rotated by a fixed amount and the leading end of the document O fails to reach the detector 49, the control section 52 judges that the document is mis-fed and a jam signal DF-JAM is applied to the apparatus body 1. When a document O is on the document table 2, since the stopper 44 is retracted, the belt 38 is fed a given distance and the leading end of the document O does not reach the detector 50, the control section also sends a jam signal DF-JAM to the apparatus body 1. The production timing of the jam signal DF-JAM in both cases is earlier than the rise time $T_1$ of the signal DUMMY-BUSY. Therefore, the paper feeding operation from the storing cassette 14 or 15 has not yet been started at the time the jam signal DF-JAM is generated. Thus, the copying operation can be stopped without performing useless copying, due to the generation of the DF-JAM signal. During the period that the jam signal DF-JAM is generated, if the start switch 56 is pushed, its operation is ineffective. Nevertheless, the apparatus body 1 remains usable. Therefore, a copying operation may be conducted without using the document transfer device 3, by setting a document O directly on the document table 2, and by operating a copy buttom (not shown) provided on the apparatus body 1. During the period that a jam signal DF-JAM is generated, mark 58e flickers, to indicate that the copying apparatus is in a jammed condition.

The control sequence produced by the control section 52 may be described with reference to FIG. 5, which illustrates a flowchart. When the start key or start switch 56 is depressed (step 1), the start signal DF-KEY is produced from the control section 52 (step 2). With the presence of the DF-KEY signal, the next step is taken to check whether or not the document set signal ORG-RDY is present or not (step 3). In step 4, it is further checked as to whether or not the set confirmation signal ORG-SET of the document transfer device 3 is present. When the presence of the ORG-SET and ORG-RDY signals is confirmed, a signal is produced for retracting the stopper 35 from the control section 52 (step 5). In response to the retraction of the stopper 35, the document O on the tray 34 moves to roller pair 36. When the document insert signal ORG-IN is given to the control section 52 (step 6), roller pair 36 starts the rotation, to take out the document O, sheet by sheet. Next, the timer is set for jam detection, and the DUMMY-BUSY signal rises (step 7). Subsequently, the rotation of roller pair 36 is stopped, and roller pair 37 and the belt 38 begin their operation (step 8). Then, the time out of the timer (the time for jam detection) is confirmed (step 9). Further, it is checked as to whether the output signal from the detector 49 is present or not (step 10). In step 10, the control section 52 judges that a jam has taken place if the detector 49 produces no output signal and produces a jam signal DF-JAM. In step 11, the time when the DUMMY-BUSY signal (FIGS. 4B–C) which has risen in step 7 falls is set to the timer (step 11), and the apparatus waits for a predetermined time of period (FIG. 4B—$T_0$ to $T_1$). Then, it is checked as to whether or not the time period $T_0$ to $T_1$ is out or not (step 12). If it times out, the DUMMY-BUSY signal falls at time $T_1$ (FIGS. 4B–C), the exposure lamp 4 is lit, and the feeding of the paper P to the roller pair 20 from a storing cassette is started (step 13). Then, the timer is set to the period ($T_2$ to $T_1$) of FIG. 4B (step 14). During this period $T_2$ to $T_1$, the scanning-ready-operation proceeds. In step 15, a check is made as to whether or not the timer set in step 14 is timing out. If the timer times out, the running of the belt 38 is stopped (step 16). When the running of the belt 38 is stopped in step 16, the document O is in contact with the stopper 44, effective scanning is performed and the image forming section performs the copying operation of the document O (step 17).

Those timers set in steps 7, 11 and 14 may be replaced by a single timer contained in the control section 52.

Effective scanning is started at time $T_2$, as shown in FIG. 4B. It is desirable that the scanning speed at the start time of effective scanning (at time $T_2$) be a predetermined speed. In executing such scanning, the movable portions of the optical scanning system, which contains the exposure lamp 4 and the mirror 5 to 7, are started at time $T_1$, from the left and under the stopper 44; so that, at time $T_2$, to perform effective scanning, the movable portions have a predetermined speed. Of course, the time period from $T_1$ to $T_2$ is a scanning-ready-operation period, not the period during which the document O is actually scanned.

It is apparent from the above that the present invention is applicable to a facsimile apparatus. In the facsimile apparatus, the scanning mentioned above is performed in the transmitter. The optical information resulting from the scanning is converted to electrical information in the transmitter. The electrical information so converted is sent to a receiver. The receiver reproduces the electrical information in the form of a picture.

What is claimed is:

1. An image forming apparatus comprising:
   an original document transfer section for transferring an original document to a predetermined position;
   a movable scanning section for optically scanning the original document which is stationary at said predetermined position;
   an image forming section for forming a visible image containing optical information on said original document which is obtained by said movable scanning section; and
   control means for controlling said sections; wherein
   said control means includes at least scanning-ready-operation control means for starting a scanning-ready-operation required by said movable scanning section at a predetermined time, before said original document reaches said predetermined position;
   said scanning-ready-operation control means including means for energizing an exposure light source of said movable scanning section and directing said exposure light source to the point where an effective scanning of said original document begins.

2. An image forming apparatus according to claim 1, wherein said control means further comprises image-forming-ready-operation control means for starting a ready operation required by said image forming section at a predetermined time, before said original document reaches said predetermined position.

3. An image forming apparatus according to claim 2, wherein said image forming section includes a photosensitive drum which directly receives the optical information on said original document from said movable scanning section and forms a toner image defined by said optical information; and a sheet material feeding device for transferring a sheet of material to which said toner image is to be transferred to said photosensitive drum; said image-forming-ready-operation control means including means for starting the drive of said sheet material feeding device at said predetermined time.

* * * * *